United States Patent [19]

Fu et al.

[11] Patent Number: 5,151,391
[45] Date of Patent: Sep. 29, 1992

[54] REACTIVATION OF SPENT, METAL-CONTAINING CRACKING CATALYSTS

[75] Inventors: Chia-Min Fu; Michael K. Maholland, both of Bartlesville, Okla.; Richard E. Lowery, Muscatine, Iowa

[73] Assignee: Phillips Petroleum Company, Bartlesville, Okla.

[21] Appl. No.: 657,709

[22] Filed: Feb. 15, 1991

[51] Int. Cl.[5] .............................................. B01J 20/34
[52] U.S. Cl. ...................................... 502/27; 502/516; 502/521; 208/52 CT
[58] Field of Search .......................... 502/27, 516, 521; 208/52 CT

[56] References Cited

U.S. PATENT DOCUMENTS

| | | | |
|---|---|---|---|
| 3,147,209 | 9/1964 | Erickson et al. | 208/120 |
| 3,147,228 | 9/1964 | Erickson | 252/412 |
| 3,168,462 | 2/1965 | Erickson | 208/120 |
| 3,173,882 | 3/1965 | Anderson | 252/413 |
| 3,252,918 | 5/1966 | Disegna et al. | 252/416 |
| 3,255,102 | 6/1966 | Sanford et al. | 208/120 |
| 3,383,169 | 5/1968 | Young | 23/112 |
| 3,493,490 | 2/1970 | Plank et al. | 208/120 |
| 3,499,846 | 3/1970 | Michalko | 252/451 |
| 3,533,959 | 10/1970 | Miale et al. | |
| 3,551,353 | 12/1970 | Chen et al. | 252/455 |
| 4,163,709 | 8/1979 | Burk et al. | 208/120 |
| 4,163,710 | 8/1979 | Burk et al. | 208/120 |
| 4,183,803 | 1/1980 | McKay | 208/52 CT |
| 4,234,452 | 11/1980 | Burk, Jr. et al. | 502/27 |
| 4,243,550 | 1/1981 | Burk et al. | 252/412 |
| 4,280,897 | 7/1981 | Shah et al. | 208/113 |
| 4,595,666 | 6/1986 | Ganguli | 502/27 |
| 4,686,197 | 8/1987 | Elvin | 502/22 |
| 4,714,688 | 12/1987 | Dinh et al. | 502/33 |
| 4,800,185 | 1/1989 | Elvin et al. | 502/26 |
| 4,814,066 | 3/1989 | Fu | 208/120 |
| 4,824,814 | 4/1989 | Elvin et al. | 502/22 |
| 4,929,336 | 5/1990 | Lowrey et al. | 208/120 |
| 4,935,121 | 6/1990 | Fu et al. | 208/120 |
| 4,954,244 | 9/1990 | Fu et al. | 208/120 |
| 5,021,377 | 6/1991 | Maholland et al. | 502/26 |

OTHER PUBLICATIONS

"Demetalation Chemistry: Control of Vanadium on Fluid Cracking Catalyst", by Jin S. Yoo et al.; Ind. Eng. Chem. Res. 1990, 29, 1183–1189.

"Technique for Removing Metal Contaminants from Catalysts", by Harold Beuther et al., I&EC Product Research and Development vol. 2, No. 1, Mar. 1963, pp. 53–57.

*Primary Examiner*—Theodore Morris
*Assistant Examiner*—William C. Diemler
*Attorney, Agent, or Firm*—K. K. Brandes

[57] ABSTRACT

A spent metal contaminated zeolite-containing catalytic cracking catalyst composition is reactivated by a process which comprises contacting with an aqueous solution of HCl and/or $HNO_3$ and/or $H_2SO_4$. The thus reactivated catalyst composition can be employed in a catalytic cracking process.

20 Claims, No Drawings

REACTIVATION OF SPENT, METAL-CONTAINING CRACKING CATALYSTS

BACKGROUND OF THE INVENTION

This invention relates to a method of reactivating spent, metal-contaminated zeolite-containing catalytic cracking catalysts. In another aspect, this invention relates to a catalytic cracking process employing a reactivated spent catalytic cracking catalyst.

Various methods of rejuvenating deactivated, metal-contaminated zeolite-containing catalytic cracking catalysts are known, such as treatment with ammonium compounds and fluorine compounds, described in U.S. Pat. No. 4,814,066. However, there is an ever present need to develop new, more effective and/or efficient catalyst reactivation processes.

SUMMARY OF THE INVENTION

It is an object of this invention to provide a process for treating a spent, metal-contaminated zeolite-containing catalytic cracking catalyst composition under such conditions as to enhance its catalytic cracking activity and/or reduce its capability of generating hydrogen during catalytic cracking. It is another object of this invention to provide a reactivated zeolite-containing catalytic cracking catalyst composition. It is a further object of this invention to provide a catalytic cracking process employing a reactivated spent catalytic cracking catalyst composition. Other objects and advantages will become apparent from the detailed description of the invention and the appended claims.

According to this invention, a catalyst reactivation process comprises the step of:

(a) contacting a spent zeolite-containing catalytic cracking catalyst composition which contains at least one metal containment with a non-oxidizing acid solution consisting essentially of water and at least one inorganic acid selected from the group consisting of hydrochloric acid, nitric acid and sulfuric acid;

(b) at least partially separating the acid-treated spent catalytic cracking catalyst composition obtained in step (a) from the aqueous solution used in step (a); and (c) drying the at least partially separated spent catalytic cracking catalyst composition obtained in step (b) (i.e., to substantially remove water from the at least partially separated spent catalytic cracking catalyst composition);

wherein said catalyst reactivation process is carried out under such conditions such as to obtain a reactivated cracking catalyst composition having higher catalytic cracking activity (as measured by enhanced feed conversion and/or higher gasoline yield attained during catalytic cracking of a hydrocarbon-containing oil) than said spent zeolite-containing catalytic cracking catalyst composition.

In a preferred embodiment, the reactivation process of this invention comprises the additional step of treating the reactivated catalytic cracking catalyst composition obtained in the acid-treatment step described above with at least one antimony compound as metals passivating agent, under such conditions as to reduce the detrimental effect of the at least one metal contaminant (still contained in said reactivated catalytic cracking catalyst composition after the acid treatment step) during catalytic cracking, as measured by hydrogen generation in a test for catalytically cracking a heavy hydrocarbon-containing oil, carried out substantially in accordance with the procedure of Example II of U.S. Pat. No. 4,794,095.

Further in accordance with this invention, a catalytic cracking process is provided comprising the step of contacting a hydrocarbon-containing feed stream with a zeolite-containing cracking catalyst composition, under such catalytic cracking conditions as to obtain at least one normally liquid (i.e., liquid at 25° and 1 atm.) hydrocarbon-containing product stream having a lower initial boiling point and higher API gravity than said hydrocarbon-containing feed stream, wherein at least a portion of said zeolite-containing cracking catalyst composition is a reactivated catalytic cracking catalyst composition having been obtained by the reactivation process of this invention (described above).

DETAILED DESCRIPTION OF THE INVENTION

The term "catalytic cracking", as used herein, implies that essentially no hydrocracking occurs and that the catalytic cracking process is carried out with a hydrocarbon-containing oil substantially in the absence of added hydrogen gas. The term "spent", as used herein, implies that at least a portion of the zeolite-containing catalyst composition employed in the reactivation process of this invention has previously been used in a process for catalytically cracking hydrocarbon-containing oils, in particular those containing metal (Ni, V, Cu) impurities, and has thereby lost some of its initial catalytic activity (i.e., its catalytic cracking activity before its use in the previous cracking process). The spent catalytic cracking catalyst composition has been regenerated by stripping of adhered oil from the catalyst (such as by steam-stripping) and subsequent heating in an oxidizing gas atmosphere (such as air) so as to burn off coke deposits on the spent catalyst composition, before the spent catalytic cracking catalyst composition is treated by the reactivation process of this invention comprising steps (a)–(c).

Any spent zeolite-containing catalyst composition, which contains at least one metal contaminant and at least a portion of which has previously been used in a catalytic cracking process, can be used as starting material in the acid treatment step of the reactivation process of this invention. The spent catalyst composition can contain any portion of such regenerated catalyst composition, ranging from 100% to about 10 weight-% (i.e., containing 0% to about 90 weight-% fresh, unused zeolite-containing catalytic cracking catalyst composition). The term "spent catalyst composition" encompasses equilibrium cracking catalysts, which are commonly employed in commercial catalytic cracking operations and generally comprise a physical blend of regenerated used catalyst composition and fresh (unused) cracking catalyst composition. An equilibrium catalyst generally comprises a mixture of catalyst particles of various ages, i.e., a portion of the equilibrium catalyst particles has passed through a varying number of cracking and regeneration cycles, while a small portion of the equilibrium catalyst particles is fresh (unused) cracking catalyst composition.

The zeolite component of the spent zeolite-containing catalytic cracking catalyst composition of this invention can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM-4, zeolite ZSM-5, zeolite ZSM-11, zeolite ZSM-12, zeolite ZSM-23, zeolite ZSM-35, zeolite ZSM-38, zeolite ZSM-48, and the like, and mixtures thereof. Additional examples of suitable zeolites are listed in U.S. Pat. No. 4,158,621. The term "zeolite", as used herein, includes zeolites which have been pretreated, such as those from which a portion of Al has been removed from the crystalline framework, and zeolites which have been ion-exchanged with rare earth metal or ammonium or by other conventional ion-exchange methods. The term "zeolite", as used herein, also includes essentially aluminum-free silica polymorphs, such as silicalite, chromia silicates, ferrosilicates, borosilicates, and the like, as disclosed in U.S. Pat. No. 4,556,749.

Generally, the zeolite component of the spent cracking catalyst composition is dispersed in a suitable solid refractory inorganic matrix material, such as alumina, silica, silica-alumina (presently preferred), aluminum phosphate, magnesium oxide, mixtures of two or more of the above-listed materials, and the like. The preparation of such zeolite/matrix cracking catalyst compositions is well known and is not a critical feature of this invention. Generally, the surface area (measured by nitrogen adsorption, substantially in accordance with the BET method of Brunauer, Emmet and Teller) of the spent zeolite/matrix cracking catalyst composition used in step (a) is in the range of from about 100 to about 800 m$^2$/g. Generally, the weight ratio of zeolite to matrix material in the spent cracking catalyst composition is in the range of from about 1:20 to about 1:1.

The spent zeolite-containing cracking catalyst composition employed in the reactivation process of the invention contains metal compounds as contaminants (generally as oxides), such as compounds of Ni, V, Fe, and Cu, and the like, in particular Ni and V. Contaminants of each metal can generally be present in amounts ranging from traces (about 0.01 weight-%) to about 2.0 weight-% of each contaminant metal, expressed as metal oxide. These impurities in the spent cracking catalyst compositions have generally been absorbed from the oil feed in a previous cracking process. However, the origin of these metal impurities is not believed to be a critical feature of this invention. It is within the scope of this invention to use spent cracking catalysts from which at least a portion of contaminant metals (Ni, V, Cu) have been removed (e.g., by the demetallizing process of U.S. Pat. No. 4,686,197).

The inorganic acid(s) employed in step (a) can be HCl, HNO$_3$, H$_2$SO$_4$ and mixtures thereof. The aqueous acidic contacting solution generally contains one or more of the above-described acids at any effective concentration, preferably about 0.0001 to about 1.0 mol/l, more preferably about 0.001 to about 0.05 mol/l. If HNO$_3$ and/or H$_2$SO$_4$ are employed, their concentrations are such that they do not act as oxidizing agents. The pH of the aqueous contacting solution generally is in the range of about 0 to about 3, preferably about 0.5–2.5. The aqueous acidic solution consists essentially of water and at least one of the above-cited acids, and does not contain any appreciable amounts of oxidizing agents or reducing agents or ammonium compounds (such as NH$_4$NO$_3$, NH$_4$F, NH$_4$HF$_2$, and the like), i.e., these agents/compounds are substantially absent from the acid solution.

The contacting of the spent zeolite-containing catalyst composition and the aqueous solution containing at least one inorganic acid can be carried out in any suitable manner. It can be done as a batch process in a vessel, preferably with agitation. Or it can be done continuously, such as by passing the aqueous solution comprising at least one of the above-described acid through a column filled with a spent cracking catalyst composition. Any suitable time of contact between solution and spent cracking catalyst composition can be employed, generally from about 0.05 to about 5 hours (preferably about 5–30 minutes). Any suitable temperature can be employed in this contacting step generally from about 10° C. to about 100° C. (preferably about 60°–90° C.), generally at ambient pressure (1 atm). Generally, the weight-ratio of the aqueous contacting solution to the spent cracking catalyst is in the range of from about 2:1 to about 100:1; preferably about 4:1 to about 20:1.

The thus-reactivated catalyst composition is at least partially (preferably substantially) separated from the aqueous, acidic treating solution used in step (a). Any suitable separating means can be employed in this step. Non-limiting examples of suitable solid/liquid separation means are filtration, centrifugation, settling and subsequent draining or decantation of the liquid, and the like.

Optionally, the at least partially separated acid-treated catalyst composition is washed with a suitable liquid (preferably water). Generally, the temperature of the wash liquid (preferably water) is about 30°–98° C. This washing step may enhance the removal of contaminant metals (in particular vanadium) from the catalytic cracking catalyst composition. Preferred washing conditions can easily be determined by those skilled in the art.

The at least partially separated treated catalyst composition is dried in step (c), so as to substantially remove adhered water therefrom. Any effective drying conditions can be employed. Preferred drying conditions comprise a temperature of about 80°–200° C., at atmospheric pressure conditions, and a drying time of about 0.2–10 hours.

In a preferred embodiment, an additional metals passivating step (d) is carried out by treating the dried, acid-treated spent catalyst composition, obtained in step (c), with at least one antimony compound. The term "metals passivating", as used herein, implies that the detrimental effect of generating H$_2$ during catalytic cracking caused by metal deposits (such as Ni, V and Cu) on a cracking catalyst composition has been mitigated. Non-limiting examples of suitable Sb compounds are described in various patents (e.g. U.S. Pat. Nos. 3,711,422, 4,025,458, 4,190,552, 4,193,891 and 4,263,131). Preferred antimony components are antimony tris(0,0-dihydrocarbyl) phosphorodithioates, antimony oxides (more preferably Sb$_2$O$_5$), antimony carboxylates, antimony mercaptides, antimony fluorides, and mixtures thereof.

In this additional metals passivating step, the acid-treated spent cracking catalyst composition is contacted (generally impregnated or sprayed) with a solution or, alternatively, a dispersion of at least one of the above-described metals passivating compounds of antimony in a suitable liquid medium (such as water) so as to incorporate into the acid-treated spent catalyst composition of the antimony compound in the solution or dispersion can be applied (preferably about 0.01–0.5 mol/l Sb). Any suitable weight ratio of the metals passivating compound to the acid-treated spent cracking catalyst composition can be applied in this metals passivating step.

Generally, this weight ratio is in the range of from about 0.00001:1 to about 0.5:1, preferably in the range of from about 0.001:1 to about 0.02:1. Generally, this additional metals passivating step is carried out at any suitable temperature, preferably, at a temperature of about 10° to about 95° C.

Preferably, the additional metals passivating step is followed by another drying step (preferably in air or an inert gas such as $N_2$, for about 0.2-10 hours, at a temperature of about 100° to about 200° C.). The drying step may be followed by an additional calcining step (preferably at a temperature of about 200° to about 750° C., for about 0.2-10 hours, in air or an inert gas such as $N_2$). In the calcining step, the applied antimony compound is substantially converted to an oxidic form (e.g., $Sb_2O_3$ and/or $Sb_2O_5$).

Any suitable effective total level of the metals passivating element in the acid-treated spent catalytic cracking catalyst composition can be attained. Generally, this level is in the range of from about 0.01 to about 5 weight-% Sb, based on the weight of the substantially dry material. Preferably, this level is about 0.02-2 weight-% Sb.

The reactivated cracking catalyst composition obtained in the above-described reactivation process of this invention can be used in any catalytic cracking process, i.e., a process for catalytically cracking hydrocarbon-containing oil feedstocks, in any suitable cracking reactor (e.g., in a FCC reactor or in a Thermofor moving bed reactor), essentially in the absence of added hydrogen gas. The reactivated catalyst composition obtained in the above-described steps can be used alone or in admixture with fresh (unused) zeolite-containing catalyst composition in catalytic cracking processes.

The hydrocarbon-containing feed stream for the catalytic cracking process of this invention can be any suitable feedstock. Generally the feed has an initial boiling point (ASTM D 1160) in excess of about 400° F., preferably a boiling range of from about 400° to about 1200° F., more preferably a range of from about 500° to about 1100° F., measured at atmospheric pressure conditions. The API gravity (measured at 60° F.) generally is in the range of from about 5 to about 40, preferably from about 10 to about 35. Generally, these feedstocks contain Ramsbottom carbon residue (ASTM D 524; usually about 0.1-20 weight-%), sulfur (generally about 0.1-5 weight-% S), nitrogen (generally about 0.05-2 weight-% N), nickel (generally about 0.05-30 ppm Ni, i.e., parts by weight of Ni per million parts by weight of feed), vanadium (generally about 0.1-50 ppm V) and copper (generally about 0.01-30 ppm Cu). Non-limiting examples of suitable feedstocks are light gas oils, heavy gas oils, vacuum gas oils, cracker recycle oils (cycle oils), residua (such as distillation bottoms fractions), and hydrotreated residua (e.g., hydrotreated in the presence of Ni, Co, Mo-promoted alumina catalysts), liquid coal pyrolyzates, liquid products from extraction or pyrolysis of tar sand, shale oils, heavy fractions of shale oils, and the like. The presently most preferred feedstocks are heavy gas oils and hydrotreated residua.

Any suitable reactor can be used for the catalytic cracking process of this invention. Generally, a fluidized-bed catalytic cracking (FCC) reactor (preferably containing one or more risers) or a moving-bed catalytic cracking reactor (e.g., a Thermofor catalytic cracker) is employed, preferably a FCC riser cracking unit. Examples of such FCC cracking units are described in U.S. Pat. Nos. 4,377,470 and 4,424,116. Generally, a catalyst regeneration unit (for removal of coke deposits) is combined with the FCC cracking unit, as is shown in the above-cited patents.

Specific operating conditions of the cracking operation depend greatly on the type of feed, the type and dimensions of the cracking reactor and the oil feed rate. Examples of operating conditions are described in the above-cited patents and in many other publications. In an FCC operation, generally the weight ratio of catalyst composition to oil feed (i.e., hydrocarbon-containing feed) ranges from about 2:1 to about 10:1, the contact time between oil feed and catalyst is in the range of from about 0.2 to about 2.0 seconds, and the cracking temperature is in the range of from about 800° to about 1200° F. Generally, steam is added with the oil feed to the FCC reactor so as to aid in the dispersion of the oil as droplets. Generally, the weight ratio of steam to oil feed is in the range of from about 0.05:1 to about 0.5:1.

The separation of the thus used crackign catalyst composition from gaseous and liquid cracked products and the separation of cracking products into various gaseous and liquid product fractions can be carried out by any conventional separation means. The most desirable product fraction is gasoline (ASTM boiling range: about 180°-400° F.). Non-limiting examples of such separation schemes are shown in "Petroleum Refining" by James H. Gary and Glenn E. Handwerk, Marcel Dekker, Inc., 1975.

Generally, the separated, used cracking catalysts are regenerated, preferably by steam stripping for removal of adhered oil and subsequent heating under oxidizing conditions so as to burn off carbon deposits. At least a portion of the regenerated cracking catalyst composition can then be treated by the reactivation process of this invention, and thereafter be recycled to the catalytic cracking reactor, generally in admixture with fresh (unused) cracking catalyst.

The following examples are presented to further illustrate this invention and are not to be considered as unduly limiting the scope of this invention.

EXAMPLE I

This example illustrates the reactivating treatment of a metal-contaminated equilibrium cracking catalyst composition with various acid solutions. The zeolite-containing equilibrium catalytic cracking composition was a blend of fresh cracking catalyst and of spent cracking catalyst (which had been used and regenerated in a FCC cracking operation at a refinery of Phillips Petroleum Company). This equilibrium catalyst composition (labeled "J-8802") contained about 10 weight-% zeolite, which was embedded in a silica-alumina matrix, 0.18 weight-% Ni, 0.32 weight-% V, 0.53 weight-% Fe, 0.01 weight-% Cu, 0.06 weight-% Sb, and 0.34 weight-% Na. "J-8802" had a surface area of about 110 $m^2/g$, a total pore volume of 0.18 cc/g, an apparent bulk density of 0.90 g/cc, and a zeolite unit cell size of 24.36 Å.

Catalyst A was prepared by heating 100 grams of J-8802 with 1500 cc of a 0.1 molar aqueous solution of HCl under reflux conditions for about 1 hour. The pH of the acid solution was maintained at about 1 during refluxing by addition of fresh acid solution. The thus-treated catalyst was separated from the acid solution by filtration, washed with about 1 liter of water, and dried for about 16 hours at 120° C. About 11% of nickel and 29% of vanadium present in J-8802 was removed by this treatment with aqueous HCl.

Catalyst B was prepared by heating 100 grams of J-8802 with 1500 cc of a 0.1 molar aqueous solution of HNO₃ under reflux conditions for about 1 hour, followed by filtering, washing and drying, as described for Catalyst A. The pH of the acid solution was maintained at about 1 during refluxing by addition of fresh acid solution. About 9% of nickel and 20% of vanadium present in J-8802 were removed by this treatment with aqueous HNO₃.

EXAMPLE II

This example illustrates the performance of the treated spent cracking catalysts described in Example I in a catalytic cracking test reactor.

The test reactor was a MCBU (micro-confined bed unit) cracking test reactor, substantially in accordance with the procedure of Example II of U.S. Pat. No. 4,794,095. Cracking test conditions comprised a temperature of about 950° F., a catalyst-to-oil weight ratio of 6:1, and the use of a hydrotreated residuum as oil feed having API gravity (at 60° F.) of 18.7, sulfur content of 0.53 weight-%, basic nitrogen content of 0.09 weight-%, Conradson carbon content of 6.7 weight-%, nickel content of 10.6 ppm and vanadium content of 12.7 ppm. Average test results of at least two duplicate runs for each catalyst are summarized in Table I.

TABLE I

| Catalyst | Average Conversion (Wt-% of Feed) | Average Gasoline Yield[1] | Average Hydrogen Generation[2] |
|---|---|---|---|
| J-8802 (Base Catalyst) | 76.2 | 50.0 | 398 |
| A (Invention) | 81.5 | 51.4 | 404 |
| B (Invention) | 81.3 | 51.5 | 408 |

[1] weight-% of converted feed
[2] standard cubic feed H₂ per barrel of converted feed.

Test results in Table I clearly show that extraction of the equilibrium catalyst J-8802 with aqueous HCl (Catalyst A) or NHO₃ (Catalyst B) resulted in enhanced conversion and gasoline yield.

EXAMPLE III

This example illustrates the effect of the treatment with an antimony compound on the performance of acid-treated equilibrium cracking catalysts.

Catalyst C was prepared by impregnating 34.0 g of J-8802 equilibrium catalyst with 16.4 g of a solution of 350 cc water and 3.32 g of Phil-Ad CA-6000 (an aqueous dispersion of Sb₂O₅, containing about 20 weight-% Sb; marketed by Catalyst Resources, Inc., Pasadena, Tex.), drying at 120° F. for about 2 hours, and calcining in air for 1 hour at 1250° F. Catalyst C contained 1600 ppm Sb.

Catalyst D was prepared substantially in accordance with the procedure for catalyst C, except that the HCl acid-washed Catalyst A was used in lieu of the J-8802 catalyst for impregnation with Phil-Ad CA-6000. Catalyst D contained 1600 ppm Sb.

Catalyst E was prepared substantially in accordance with the procedure for catalyst C, except that the HNO₃ acid-washed Catalyst B was used in lieu of the J-8802 catalyst for impregnation with Phil-Ad CA-6000. Catalyst E contained 1600 ppm Sb.

Catalytic cracking tests were carried out with Catalysts C, D and E, essentially in accordance with the procedure described in Example I. Test results (averages of two or more tests) are summarized in Table II, and demonstrate the beneficial effect of the additional antimony treatment after acid treatment versus acid treatment alone (see Table I): in particular higher conversion and lower H₂ generation.

TABLE II

| Catalyst | Average Conversion (wt-% of Feed) | Average Gasoline Yield[1] | Average Hydrogen Generation[1] |
|---|---|---|---|
| C (Control) | 75.6 | 50.3 | 337 |
| D (Invention) | 82.0 | 52.4 | 293 |
| E (Invention) | 82.3 | 51.5 | 335 |

[1] see footnotes of Table I

Reasonable variations, modifications, and adaptations for various conditions and uses can be made within the scope of the disclosure and appended claims.

That which is claimed is:

1. A catalyst reactivation process comprising the steps:
   (a) contacting a spent zeolite-containing catalytic cracking catalyst composition which contains at least one metal contaminant with a non-oxidizing acid solution consisting essentially of water and at least one inorganic acid selected from the group consisting of hydrochloric acid, nitric acid and sulfuric acid;
   (b) at least partially separating the acid-treated catalyst composition obtained in step (a) from the aqueous solution used in step (a);
   (c) drying the at least partially separated catalyst composition obtained in step (b); and
   (d) contacting the dried catalyst composition obtained in step (c) with a solution comprising at least one antimony compound;
   wherein said catalyst reactivation process is carried out under such conditions as to obtain a reactivated cracking catalyst composition exhibiting higher cracking activity and lower hydrogen generation than said spent zeolite-containing catalytic cracking catalyst composition, as determined during catalytic cracking of a hydrocarbon-containing oil substantially in the absence of added hydrogen gas.

2. A process in accordance with claim 1, wherein said at least one metal contaminant contained in said spent catalytic cracking catalyst composition is selected from the group consisting of compounds of nickel, vanadium, iron and copper.

3. A process in accordance with claim 1, wherein said at least one inorganic acid is nitric acid.

4. A process in accordance with claim 1, wherein the pH of said acid solution employed in step (a) is about 0-3.

5. A process in accordance with claim 1, wherein step (a) is carried out at a temperature of about 10°-100° C.

6. A process in accordance with claim 1, wherein in step (a) the weight ratio of said acid solution to said spent zeolite-containing catalytic cracking catalyst composition is about 2:1 to about 100:1.

7. A process in accordance with claim 1 comprising the additional step of washing said at least partially separated reactivated catalytic cracking catalyst composition with water before step (c).

8. A process in accordance with claim 1, wherein step (d) is carried out under such conditions as to incorporate about 0.01 to about 5 weight-% antimony into said reactivated catalytic cracking catalyst composition.

9. A reactivated zeolite-containing catalytic cracking catalyst composition obtained by the process of claim 1.

10. A reactivated zeolite-containing catalytic cracking catalyst composition obtained by the process of claim 3.

11. A reactivated zeolite-containing catalytic cracking catalyst composition obtained by the process of claim 3.

12. A process in accordance with claim 1, comprising the additional step of heating the cracking catalyst composition obtained in step (d) at a temperature of about 100°-200° C. for about 0.2-10 hours and thereafter at a temperature of about 200°-750° C. for about 0.2-10 hours.

13. A catalyst reactivation process comprising the steps:
  (a) contacting a spent zeolite-containing catalytic cracking catalyst composition which contains at least one metal contaminant with a non-oxidizing acid solution consisting essentially of water and hydrochloric acid;
  (b) at least partially separating the acid-treated catalyst composition obtained in step (a) from the aqueous solution used in step (a);
  (c) drying the at least partially separated catalyst composition obtained in step (b); and
  (d) contacting the dried catalyst composition obtained in step (c) with a solution comprising at least one antimony compound;
wherein said catalyst reactivation process is carried out under such conditions as to obtain a reactivated cracking catalyst composition exhibiting higher cracking activity and lower hydrogen generation than said spent zeolite-containing catalytic cracking catalyst composition, as determined during catalytic cracking of a hydrocarbon-containing oil substantially in the absence of added hydrogen gas.

14. A process in accordance with claim 13, wherein said at least one metal contaminant contained in said spent catalytic cracking catalyst composition is selected from the group consisting of compounds of nickel, vanadium, iron and copper.

15. A process in accordance with claim 13, wherein the pH of said acid solution employed in step (a) is about 0-3.

16. A process in accordance with claim 13, wherein step (a) is carried out at a temperature of about 10°-100° C.

17. A process in accordance with claim 13, wherein in step (a) the weight ratio of said acid solution to said spent zeolite-containing catalytic cracking catalyst composition is about 2:1 to about 100:1.

18. A process in accordance with claim 13 comprising the additional step of washing said at least partially separated reactivated catalytic cracking catalyst composition with water before step (c).

19. A process in accordance with claim 13, wherein step (d) is carried out under such conditions as to incorporate about 0.01 to about 5 weight-% antimony into said reactivated catalytic cracking catalyst composition.

20. A process in accordance with claim 13, comprising the additional step of heating the cracking catalyst composition obtained in step (d) at a temperature of about 100°-200° C. for about 0.2-10 hours and thereafter at a temperature of about 200°-750° C. for about 0.2-10 hours.

* * * * *